United States Patent
Crowley

(10) Patent No.: US 9,062,982 B2
(45) Date of Patent: Jun. 23, 2015

(54) PRE-LOADING WAYPOINT DATA

(75) Inventor: Michael J. Crowley, Haslet, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 791 days.

(21) Appl. No.: 12/334,815

(22) Filed: Dec. 15, 2008

(65) Prior Publication Data

US 2010/0153007 A1 Jun. 17, 2010

(51) Int. Cl.
G01C 21/00 (2006.01)
G01C 21/32 (2006.01)
G01C 21/34 (2006.01)

(52) U.S. Cl.
CPC ............ *G01C 21/32* (2013.01); *G01C 21/3484* (2013.01)

(58) Field of Classification Search
USPC .................................................. 701/200–226
See application file for complete search history.

(56) References Cited

U.S. PATENT DOCUMENTS

| | | | |
|---|---|---|---|
| 5,699,255 A | 12/1997 | Ellis et al. | |
| 5,732,385 A * | 3/1998 | Nakayama et al. | 701/437 |
| 5,772,534 A * | 6/1998 | Dudley | 473/407 |
| 5,802,492 A | 9/1998 | DeLorme et al. | |
| 6,278,938 B1 * | 8/2001 | Alumbaugh | 701/438 |
| 6,321,158 B1 | 11/2001 | DeLorme et al. | |
| 6,453,236 B1 * | 9/2002 | Aoki | 701/455 |
| 6,662,102 B2 * | 12/2003 | Katayama et al. | 701/467 |
| 6,675,092 B1 * | 1/2004 | Katayama et al. | 701/410 |
| 7,161,503 B2 * | 1/2007 | Takayanagi | 340/995.12 |
| 7,203,597 B2 | 4/2007 | Sato et al. | |
| 7,315,259 B2 | 1/2008 | Sacks | |
| 7,672,778 B1 * | 3/2010 | Elliott | 701/417 |
| 7,831,387 B2 * | 11/2010 | Golding et al. | 701/438 |
| 7,848,876 B2 * | 12/2010 | Simonds et al. | 701/117 |
| 2002/0067379 A1 | 6/2002 | Kenyon et al. | |
| 2003/0060973 A1 * | 3/2003 | Mathews et al. | 701/209 |
| 2005/0143098 A1 * | 6/2005 | Maillard | 455/456.5 |
| 2005/0288859 A1 * | 12/2005 | Golding et al. | 701/211 |
| 2006/0080032 A1 * | 4/2006 | Cooper et al. | 701/208 |
| 2006/0200302 A1 | 9/2006 | Seko | |
| 2007/0080830 A1 * | 4/2007 | Sacks | 340/995.1 |
| 2008/0045245 A1 * | 2/2008 | Billmaier et al. | 455/457 |
| 2008/0249667 A1 * | 10/2008 | Horvitz et al. | 701/1 |
| 2009/0326810 A1 * | 12/2009 | Callaghan et al. | 701/208 |

FOREIGN PATENT DOCUMENTS

| | | |
|---|---|---|
| EP | 1251335 A2 | 10/2002 |
| EP | 1498696 A1 | 1/2005 |

(Continued)

OTHER PUBLICATIONS

English Translation of JP 2007024503A Abstract only.*

(Continued)

*Primary Examiner* — Rami Khatib

(74) *Attorney, Agent, or Firm* — Fleit Gibbons Gutman Bongini & Bianco P.L.

(57) ABSTRACT

A method of downloading map data to a portable electronic device entails determining a route, identifying waypoints along the route, and downloading and caching map data for the waypoints along the route. The map data for areas around each of the waypoints (intersections, decision points) are thus preloaded prior to the device arriving at or near each waypoint. This ensures that the device has locally cached all the map data needed to render a navigationally useful map of the area around each waypoint.

20 Claims, 6 Drawing Sheets

(56) References Cited

FOREIGN PATENT DOCUMENTS

| EP | 1530025 | A2 | | 5/2005 |
|---|---|---|---|---|
| EP | 1549096 | A1 | | 6/2005 |
| EP | 1909066 | A1 | | 4/2008 |
| JP | 2003344070 | | | 12/2003 |
| JP | 2007024503 | A | * | 2/2007 |

OTHER PUBLICATIONS

Extended European Search report mailed Apr. 14, 2009; in corresponding European patent application No. 08171651.6.
European Search Report mailed Apr. 9, 2014; in corresponding European application No. 08171651.6.

* cited by examiner

Preload Q,L,H,T,O

PRE-LOADING WAYPOINT DATA

CROSS-REFERENCE TO RELATED APPLICATIONS

This is the first application filed for the present technology.

TECHNICAL FIELD

The present disclosure relates generally to wireless communications devices and, in particular, to techniques for downloading and displaying maps on wireless communications devices.

BACKGROUND

Wireless communications devices such as the BlackBerry® by Research In Motion Limited provide a variety of useful functions, such as voice communication, e-mail and Web browsing. Of growing popularity are mapping applications that take advantage of the device's wireless link and Web capabilities to download and render maps on the device. When coupled to a location-fixing system such as a Global Positioning System (GPS) receiver, either embedded as a GPS chipset or externally (e.g. Bluetooth™ connected), these mapping applications can be used for navigation and other location-based services (LBS). The ability of the wireless device to efficiently download map data from a map server is constrained by network availability and the limited bandwidth of the wireless link. Thus, over-the-air bandwidth can play a significant role in determining the overall map-generating performance of the device.

When traveling at high speed, the device may have difficulty downloading and rendering useful detailed maps in real time. This can seriously inhibit effective navigation where map detail of key intersections or decision points along a route are unavailable or are only partially downloaded and rendered. A solution to this technical problem would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides a novel method, machine readable medium, and portable electronic device that preload map data for waypoints along a route to ensure that maps of navigationally significant decision points or waypoints are available in real time.

Thus, an aspect of the present technology is a method of downloading map data to a portable electronic device. The method entails determining a route, identifying waypoints along the route, and downloading and caching map data for the waypoints along the route.

Another aspect of the present technology is a machine readable medium comprising code adapted to perform the steps of the foregoing method when the machine readable medium is loaded into memory and executed on a processor of a wireless communications device.

Yet another aspect of the present technology is a portable electronic device such as for example a wireless communications device, GPS navigation unit, smartphone, etc, that is capable of preloading map data for waypoints. The portable electronic device has a positioning subsystem for determining a current location of the device, a radiofrequency transceiver for requesting map data based on the current location of the device and for receiving the map data for map tiles corresponding to the current location of the device, a display for displaying an onscreen map based on the map data that has been received using the radiofrequency transmitter. The device further includes a processor operatively coupled to memory for determining a route, identifying at least one waypoint along the route, and preloading in the memory of the device further map data for a map tile corresponding to at least one waypoint that is geographically beyond the map tile corresponding to the current location of the device.

The details and particulars of these aspects of the technology will now be described below, by way of example, with reference to the attached drawings.

Figure 1:
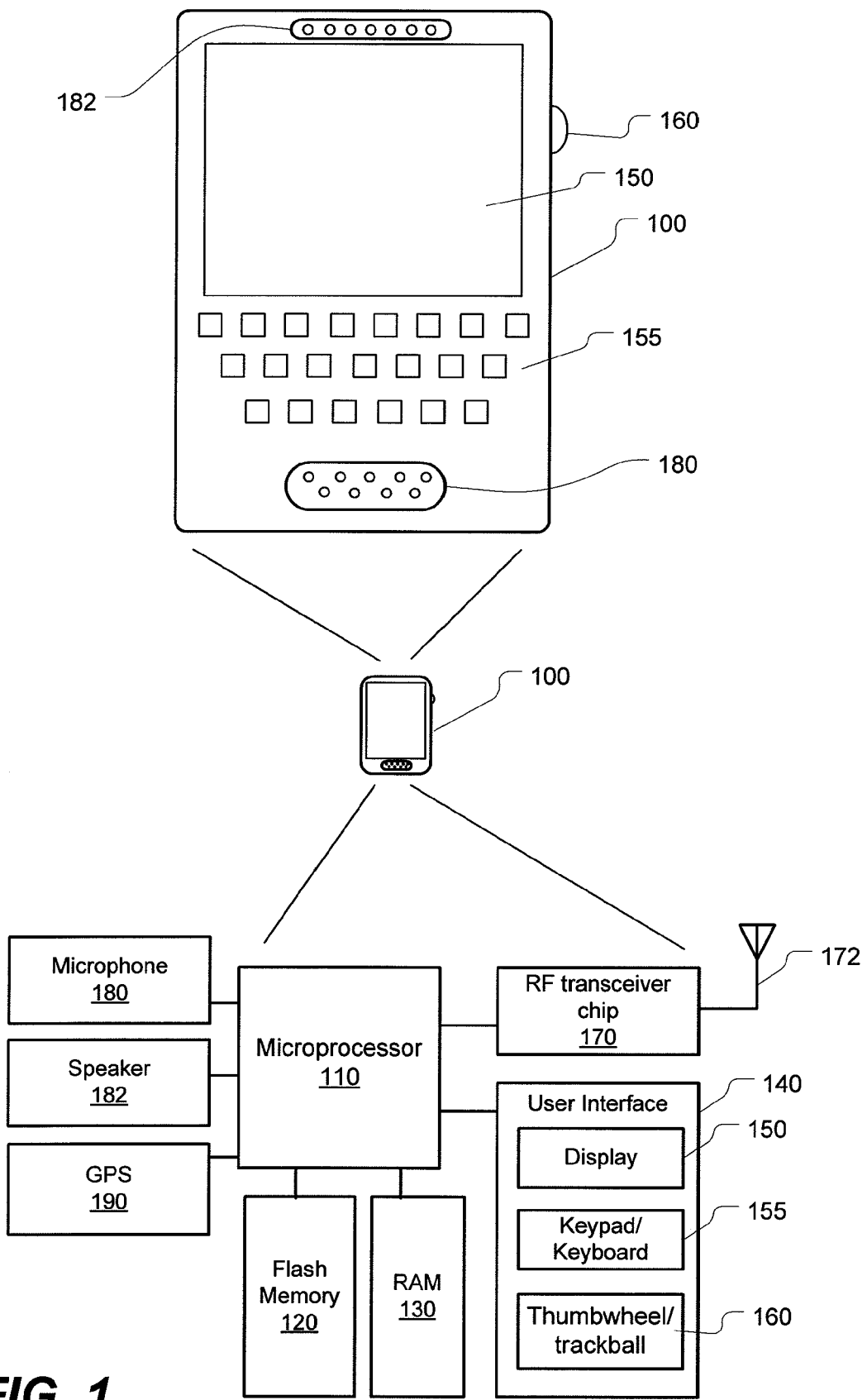
FIG. 1 is a schematic depiction of an exemplary wireless communications device on which the present technology can be implemented, and further depicting certain main components of the device in block diagram format.

FIG. 1 is a schematic depiction of a wireless communications device 100 as an example of one type of portable electronic device on which the present technology can be implemented. This novel technology can be implemented on any type of portable electronic device that can download map data and display maps based on the map data, including smartphones, cell phones, PDAs, computing tablets, wireless-enabled laptops, etc.

As shown in FIG. 1, the portable electronic device 100 (e.g. wireless communications device) includes a microprocessor (referred to herein as a "processor") 110 operatively coupled to memory (Flash Memory 120 and RAM 130). The device 100 has a user interface 140 which includes a display (e.g. a LCD screen) 150, a keyboard/keypad 155. In the example where the portable electronic device is a wireless communications device, a thumbwheel/trackball 160 may be provided. Alternatively, the user interface may include a touch screen. The device includes a radiofrequency (RF) transceiver for sending and receiving data over the air, e.g. via cellular network, via satellite link, etc.

Where the portable electronic device is a wireless communications device, a microphone 180 and speaker 182 are provided for voice communications.

As further depicted in FIG. 1, the device 100 includes a GPS chipset 190 (or other positioning subsystem) to determine the current location of the device. The GPS chipset enables the device to be used for navigation. The navigation application typically provides turn-by-turn navigation instructions, which may optionally be audible using text-to-speech technology. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multinational Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system. References herein to "GPS" are meant to include Assisted GPS and Aided GPS.

In order to ensure that detailed (navigationally useful) maps are available in real-time for all waypoints along a route, the portable electronic device preloads the map data for areas or map tiles corresponding to each of the waypoints. For the purposes of this specification, "preloading" means that map data is downloaded in advance and cached, buffered or stored locally in the memory of the device. For the purposes of this specification, "waypoints" means intersections, decision points, forks in the route, or any other critical point along the route where a navigation decision or navigation choice may need to be made.

Figure 2:
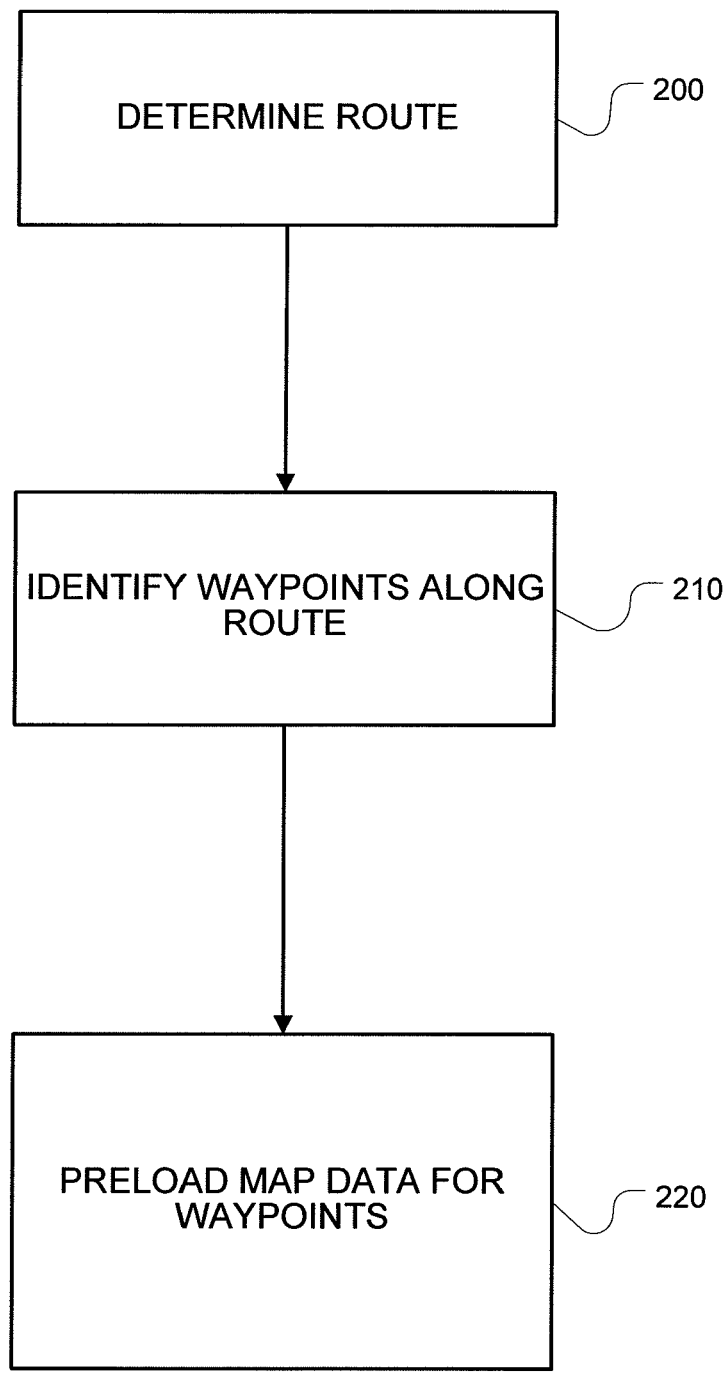
FIG. 2 is a flowchart depicting main steps of a method of preloading map data in accordance with an implementation of the present technology.

FIG. 2 is a flowchart depicting the main steps of the method of preloading map data for waypoints along a route. As shown in this figure, the method entails determining a route (at step 200), identifying waypoints along the route (step 210), and downloading and caching map data for the waypoints along the route (step 220). The route can be determined by receiving (from the user) a starting point and a destination point, thus defining a route (or at least enabling a navigation application to compute a route using any one of a number of known shortest-path or fastest-path algorithms). The route can alternatively be predicted based on a direction of travel (which in turn can be based on an average heading). The average heading can be determined by taking a number of GPS readings using a GPS chipset, for example. The route can also be determined based on historical travel patterns and by correlating the historical travel patterns with a current time and date. In other words, the device can have artificial intelligence (AI) to deduce likely routes based on the recent observed travels of the device. Thus, a route back and forth to work can be learned by the device's AI. When Monday morning comes around, the device's AI can predict that the probable route is to work.

In one implementation, a device speed is used to determine how far in advance to preload the map data. If the device is traveling slowly, it is not necessary to preload a large amount of map data for waypoints that are very far off. On the other hand, if the device is traveling quickly, e.g. on the highway, the device may need to preload waypoints that are far down the route since these will be reached soon.

In another implementation, wireless network conditions may be monitored and used to determine whether to preload map data. For example, if the wireless network is experiencing congestion, the device may initiate a download of map data sooner so that the data is available when the device approaches the waypoint. Similarly, signal strength, the availability of data service (e.g., entering an area that does not support GPRS, EDGE, or similar data services), and/or network roaming may be used to initiate a map data preload. Accordingly, one particular method may involve determining network conditions (e.g. network availability, network congestion, etc.) and preloading the map data for the waypoints along the route based on the network conditions.

The foregoing method steps can be implemented as coded instructions on a machine readable medium. In other words, the machine readable medium is a computer-readable medium upon which software code is recorded to perform the foregoing steps when the machine readable medium is loaded into memory and executed on the microprocessor of the wireless communications device.

Figure 3:
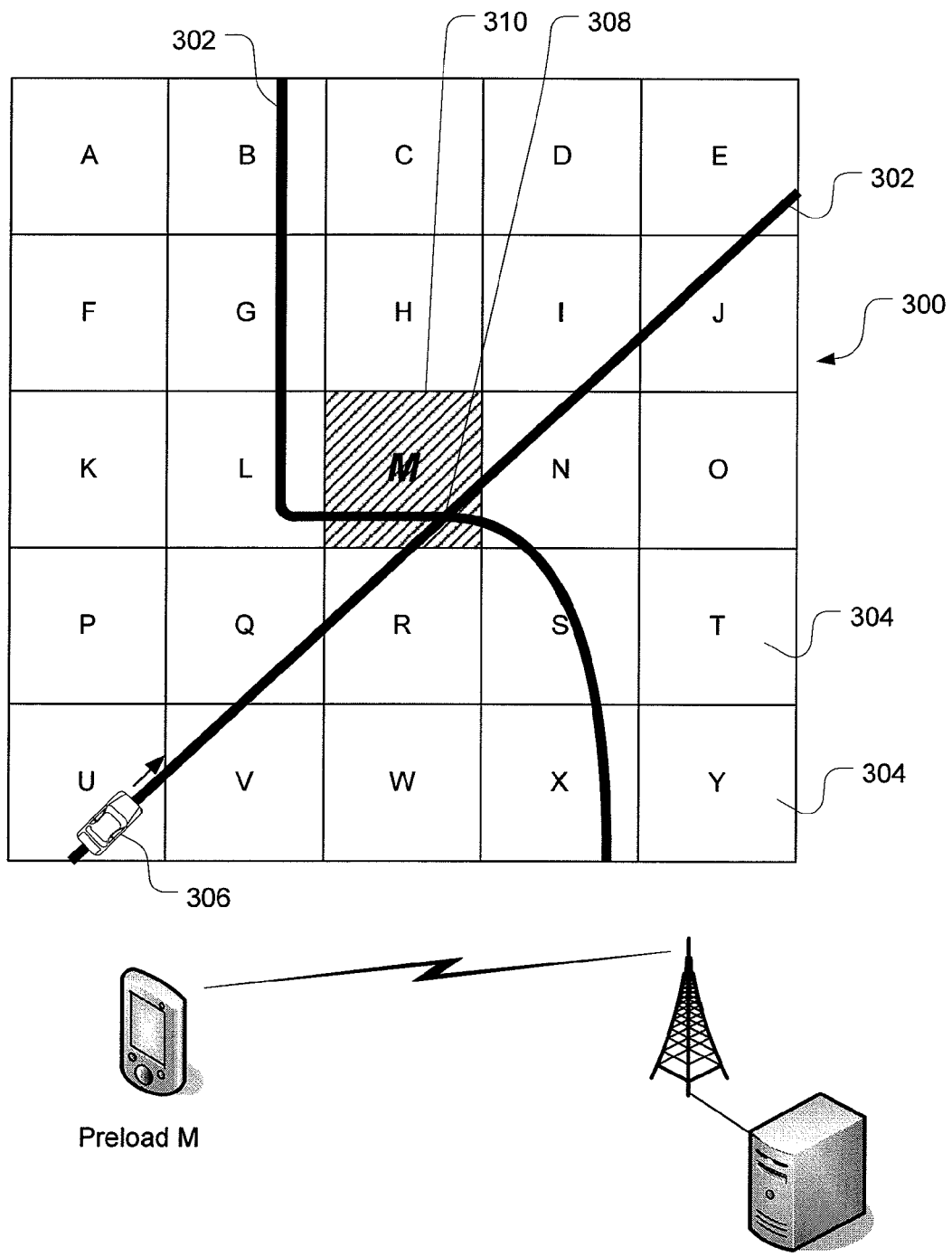
FIG. 3 is a schematic depiction of a technique for preloading a map tile for an upcoming waypoint.

FIG. 3 schematically depicts a technique for preloading map data for a map tile corresponding to a waypoint along a route. As depicted by way of example in FIG. 3, twenty-five (25) map tiles 304 (labelled A to Y) are arranged in a 5×5 array or matrix 300. For the sake of illustration, two roads 302 intersect in the area circumscribed by map tile M. A car icon 306 is shown to represent the current location and the current heading of the device (which can be determined using the GPS chipset on the device). The intersection of the two roads 302 thus defines a waypoint 308. The map tile corresponding to the waypoint 308 (i.e. map tile M) is designated as a waypoint map tile 310. This waypoint map tile 310 (map tile M) is preloaded. To preload the map tile M, map data for the waypoint map tile M (designated as 310) is downloaded and cached in the memory of the device. In other words, the map data for the map tile 310 (map tile M) is downloaded in advance of the device arriving at the area circumscribed by the waypoint map tile 310. In the example depicted in FIG. 3, the device is currently located at map tile U and is heading in a north-easterly direction along the diagonal roadway 302. This is represented by car icon 306. Using conventional map loading and navigation techniques, the device would have already loaded map tile U (the current map tile) and would then load map tile V (the next map tile along the route). Other map loading techniques involve loading an entire row of tiles at a time, thus, tiles U-Y might be loaded and then map tiles P to T loaded as the device heads out of map tile V. Using this conventional approach, however, may deprive the device of a real-time map of the intersection 308 if the device cannot load row K-O fast enough as the device exits map tile R and enters map tile M. In other words, if conventional map data loading is employed, the map data for map tile M may not be loaded in time since the device may attempt to load tiles K and L first as the device traverses tile R and enters tile M. In contrast, using the novel technique disclosed in the present application, the device preloads the map data for tile M knowing that this tile contains a waypoint (i.e. an intersection where a navigation decision needs to be made).

Figure 4:
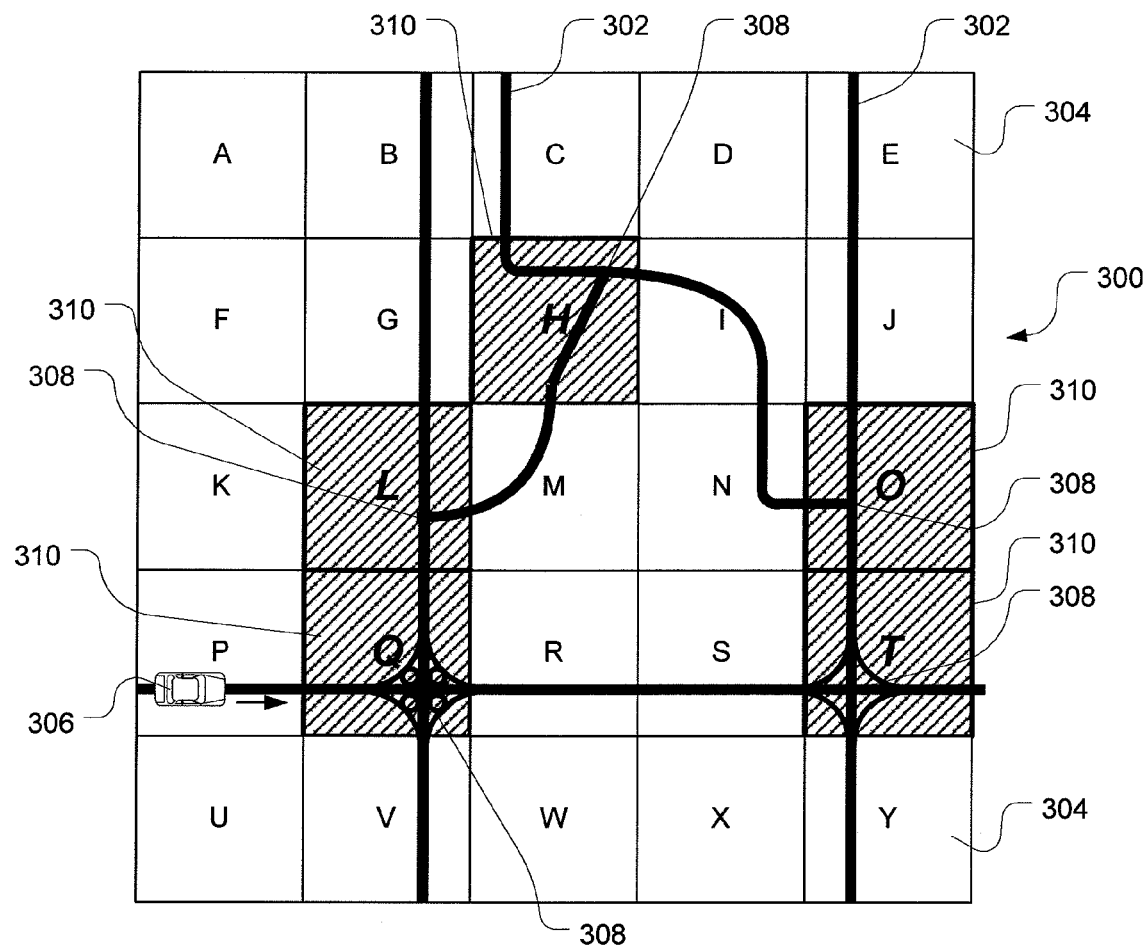
FIG. 4 is a schematic depiction of a technique for preloading a plurality of map tiles for various potential waypoints.
Figure 4:
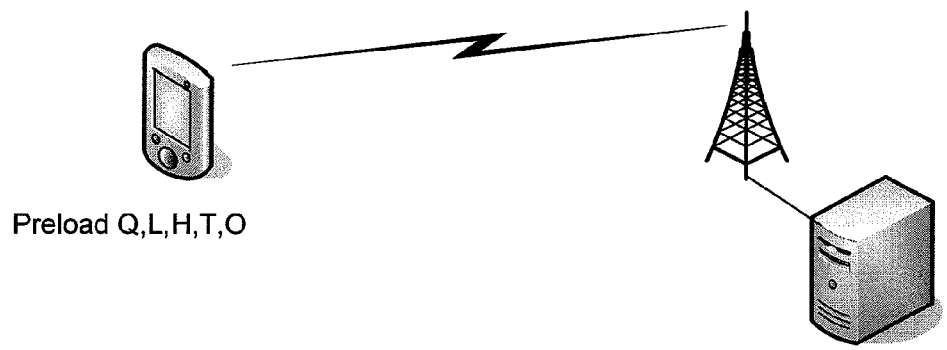

FIG. 4 schematically depicts a technique for preloading a plurality of map tiles for various potential waypoints 308. As depicted by way of example in FIG. 4, the entire array 300 contains five potential waypoints 308 (five intersections where navigation decisions need to be made). These waypoints 308 are situated within corresponding map tiles 310. In this case, these waypoint map tiles 310 are tiles Q, L, H, T and O. In this implementation, the device preloads all the map tiles having waypoints. These can furthermore be prioritized in terms of proximity (or probable path) such as for example tile Q, then tile L, then tile H, then tile T, then tile O. These are preloaded by downloading the map data for these map tiles and storing the map data locally on the device to ensure that if the device travels into one of these navigationally critical areas, the map data is readily available for rendering onscreen.

Figure 5:
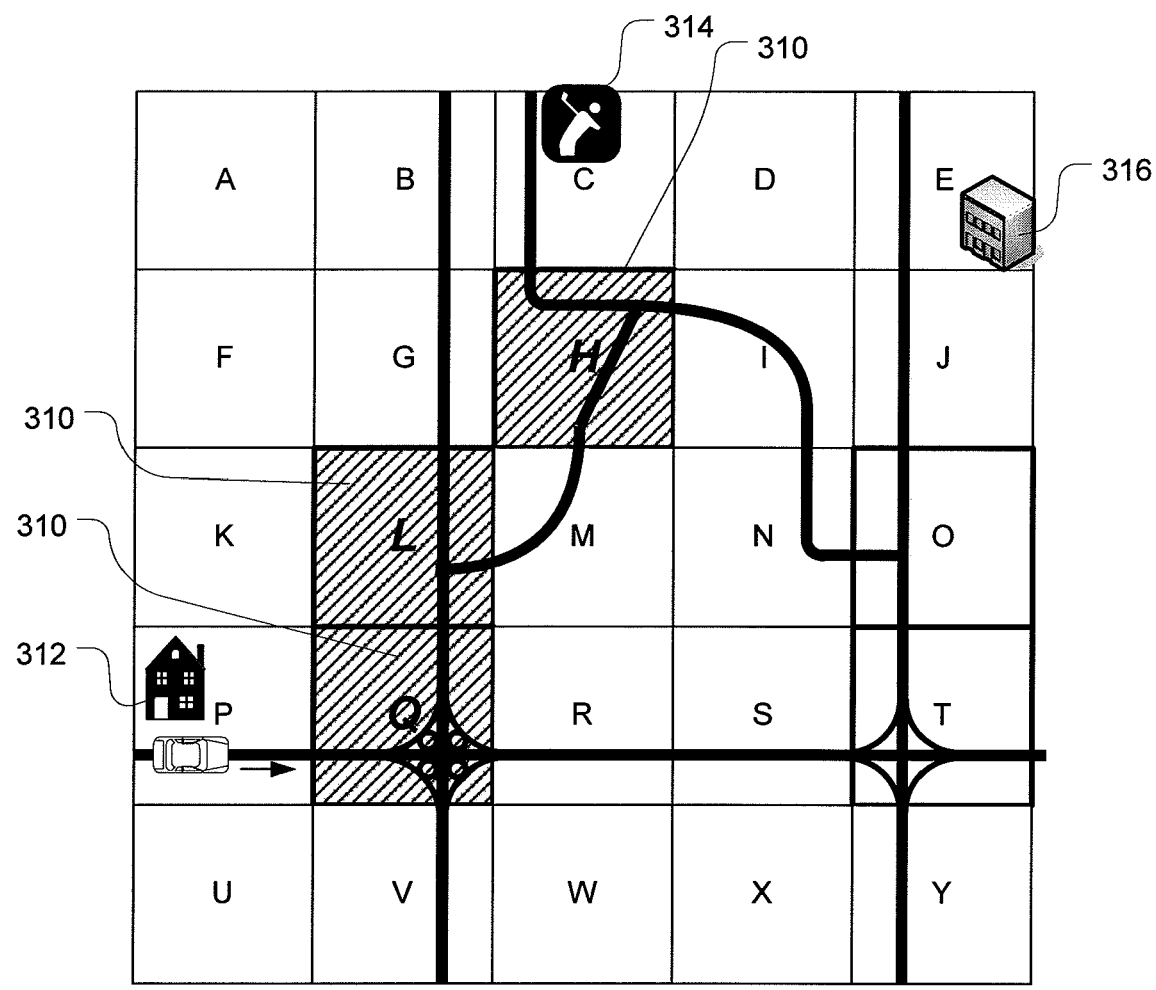
FIG. 5 is a schematic depiction of a technique for preloading a plurality of map tiles for all waypoints along an example route from home to a golf course.
Figure 5:

As mentioned above, in one implementation of the present technology, an artificial intelligence can observe or learn travel patterns and correlate these learned travel patterns to the current date and time in order to predict the route that the device is likely to take. The waypoints along the predicted route can then be identified and the associated map data obtained and cached. FIG. 5 is a schematic depiction of a technique for preloading a plurality of map tiles for all waypoints along an example route from home 312 to a golf course 314. For example, if the device travels every Saturday morning from home to the golf course in the summer months, then the device's AI can learn that travel pattern and apply its knowledge of that pattern to predict that on Saturday mornings the likely route will be from home 312 to the golf course 314. Accordingly, the device identifies waypoints along that route and preloads (downloads and caches) the map data for tiles Q, L and H.

Figure 6:
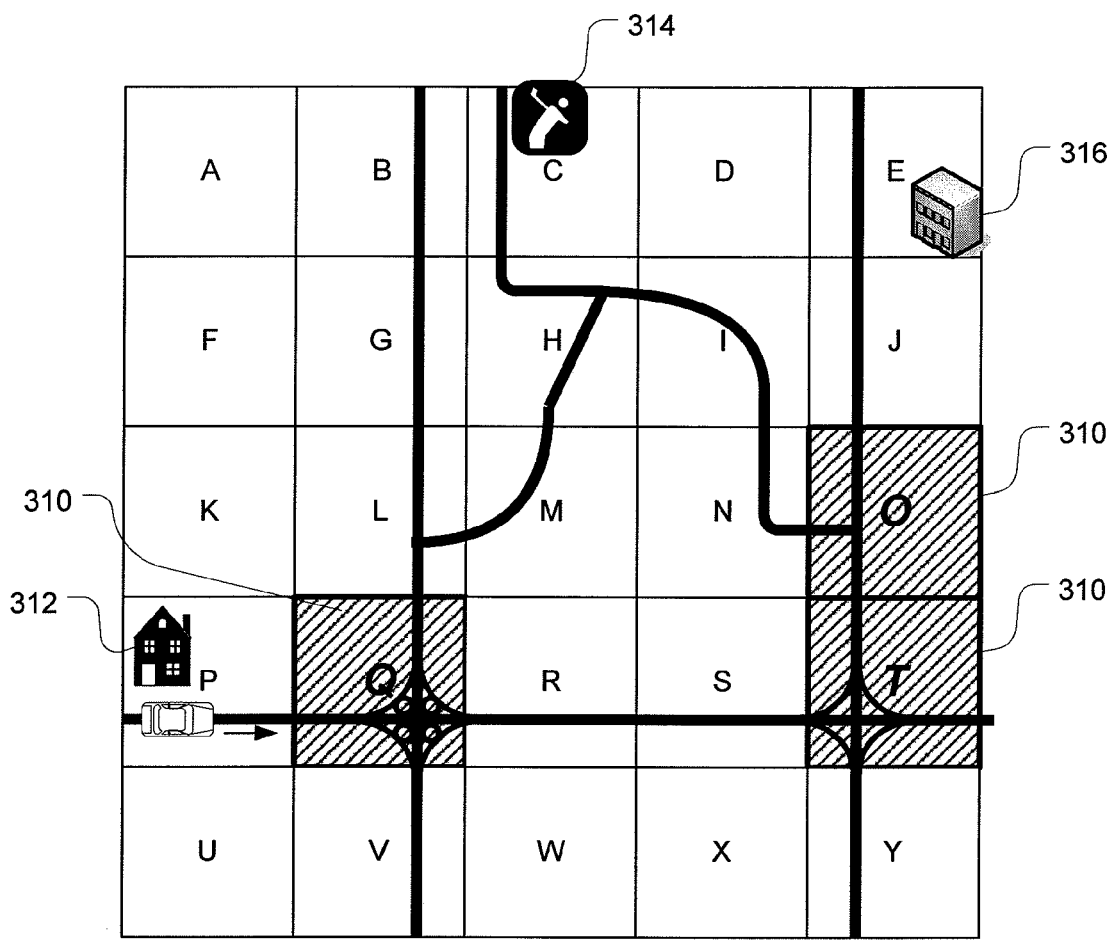
FIG. 6 is a schematic depiction of a technique for preloading a plurality of map tiles for all waypoints along an example route from home to work.
Figure 6:
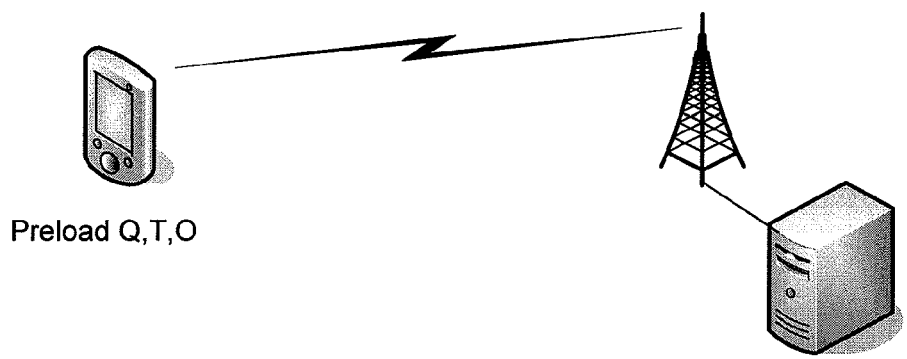

As another example, consider the case where the device's AI learns that every weekday Monday to Friday the device commutes to and from work. FIG. 6 is a schematic depiction of a technique for preloading a plurality of map tiles for all waypoints along an example route from home 312 to work 316. In this example, the device preloads tiles Q, T and O representing the tiles where waypoints (intersections) exist.

In this two examples depicted in FIGS. 5 and 6, the user may well know the route without needing navigation assistance. However, the AI and learning of travel patterns can be used in many more complex and subtle manners. For example, the user of the device may travel once a year (e.g. July $4^{th}$ weekend or Thanksgiving) to a family reunion. This route may not be familiar for the user, in which case the preloading of map data may help to ensure that maps of key intersections or waypoints are available in real-time.

As another example, consider the case where the route is derived from a calendar entry for a meeting in a location that the user is unfamiliar with. The location of the meeting (as the destination point) and either the user's home or workplace (as the starting point) can be used to compute a route. The device then identifies the waypoints and preloads these to ensure the device has the map data cached for rendering all the critical maps along the route. The calendar entry information can be shared with the navigation application by periodically polling the calendar entry for upcoming appointments where there is location information specified.

The waypoint preloading technology disclosed herein can be used regardless whether the map data is in vector format or bitmap format.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method, performed by a portable electronic device, of downloading map data to the portable electronic device, the method comprising:
   determining, by a processor, a route;
   identifying navigationally significant waypoints along the route where navigation decisions are to be made;
   prioritizing map tiles for download based on a proximity of each waypoint to the device; and
   downloading and caching map data for one or more prioritized map tiles corresponding to the waypoints along the route.

2. The method as claimed in claim 1 wherein determining a route comprises receiving a starting point and a destination point.

3. The method as claimed in claim 1 wherein determining a route comprises predicting a direction of travel based on an average heading.

4. The method as claimed in claim 1 wherein determining a route comprises predicting the route based on historical travel patterns and by correlating the historical travel patterns with a current time and date.

5. The method as claimed in claim 1 further comprising determining a device speed to determine how far in advance to preload the map data, the device speed being related to the speed the device is travelling along the route.

6. The method as claimed in claim 1 further comprising:
   determining network conditions; and
   preloading the map data for the waypoints based on the network conditions.

7. The method according to claim 1, further comprising:
   prioritizing download of the map data for the one or more map tiles based on a preloading condition; and
   downloading and caching the map data for the one or more map tiles according to the preloading condition.

8. The method according to claim 7, wherein the preloading condition is based on a device speed, the device speed being related to the speed the device is travelling along the route, or network conditions, or both.

9. A non-transitory machine readable storage medium comprising instructions in code which, when loaded into memory and executed on a processor of a portable electronic device, causes the device to perform the acts of:
   determining a route;
   identifying navigationally significant waypoints along the route where navigation decisions are to be made;
   prioritizing map tiles for download based on a proximity of each waypoint to the device; and
   downloading and caching map data for one or more prioritized map tiles corresponding to the waypoints along the route.

10. The machine readable medium as claimed in claim 9 comprising code for determining when to preload the map data based on a device speed calculated from a reading taken by a positioning subsystem onboard the device, the device speed being related to the speed the device is travelling along the route.

11. The machine readable medium according to claim 9, further comprising code for:
   prioritizing download of the map data for the one or more map tiles based on a preloading condition; and
   downloading and caching the map data for the one or more map tiles according to the preloading condition.

12. The machine readable medium according to claim 11, wherein the preloading condition is based on a device speed, the device speed being related to the speed the device is travelling along the route, or network conditions, or both.

13. A portable electronic device comprising:
   a positioning subsystem that determines a current location of the device;
   a radiofrequency transceiver that receives map data;
   a display that displays an onscreen map based on the map data; and a processor operatively coupled to a memory that determines a route, identifies navigationally significant waypoints along the route where navigation decisions are to be made, prioritizes map tiles for download based on a proximity of each waypoint to the device, and preloads in the memory of the device one or more prioritized map tiles corresponding to the waypoints along the route.

14. The device as claimed in claim 13 wherein the processor determines the route by determining a current direction of travel of the device.

15. The device as claimed in claim 13 wherein the processor determines the route by receiving starting and destination points.

16. The device as claimed in claim 13 wherein the processor determines the route based on historical travel patterns.

17. The device as claimed in claim 13 wherein the positioning subsystem is a GPS receiver for determining the current location, current speed and current heading of the device, the GPS receiver providing current location, current speed and current heading data to the processor to enable the processor to determine when to preload the map tiles for the waypoints along the route.

18. The device as claimed in claim 13 wherein the processor cooperates with the radiofrequency transceiver to determine network conditions and to preload the map data for the waypoints along the route based on the network conditions.

19. The device according to claim 13, wherein the processor prioritizes download of the map data for the one or more map tiles based on a preloading condition, and preloads in the memory the map data for the one or more map tiles according to the preloading condition.

20. The device according to claim 19, wherein the preloading condition is based on a device speed, the device speed being related to the speed the device is travelling along the route, or network conditions, or both.

* * * * *